(12) United States Patent
Yuan et al.

(10) Patent No.: US 11,074,934 B1
(45) Date of Patent: *Jul. 27, 2021

(54) HEAT ASSISTED MAGNETIC RECORDING (HAMR) MEDIA WITH CURIE TEMPERATURE REDUCTION LAYER

(71) Applicant: WD Media, LLC, San Jose, CA (US)

(72) Inventors: Hua Yuan, San Jose, CA (US); Antony Ajan, San Jose, CA (US); Oleg Krupin, Mountain View, CA (US); B. Ramamurthy Acharya, Fremont, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 476 days.

This patent is subject to a terminal disclaimer.

(21) Appl. No.: 14/865,501

(22) Filed: Sep. 25, 2015

(51) Int. Cl.
| | |
|---|---|
| *G11B 5/66* | (2006.01) |
| *H01F 41/22* | (2006.01) |
| *G11B 5/65* | (2006.01) |
| *G11B 5/73* | (2006.01) |
| *G11B 5/00* | (2006.01) |

(52) U.S. Cl.
CPC .............. *G11B 5/66* (2013.01); *G11B 5/653* (2013.01); *G11B 5/656* (2013.01); *G11B 5/73* (2013.01); *H01F 41/22* (2013.01); *G11B 2005/0021* (2013.01)

(58) Field of Classification Search
CPC ....... G11B 5/66; G11B 5/706; G11B 5/70605; G11B 5/70615; G11B 5/70621; G11B 5/70626; H01F 41/22

USPC ......................................... 428/826, 827, 829
See application file for complete search history.

(56) References Cited

U.S. PATENT DOCUMENTS

| | | | |
|---|---|---|---|
| 6,013,161 A | 1/2000 | Chen et al. |
| 6,063,248 A | 5/2000 | Bourez et al. |
| 6,068,891 A | 5/2000 | O'Dell et al. |
| 6,086,730 A | 7/2000 | Liu et al. |
| 6,099,981 A | 8/2000 | Nishimori |
| 6,103,404 A | 8/2000 | Ross et al. |
| 6,117,499 A | 9/2000 | Wong et al. |
| 6,136,403 A | 10/2000 | Prabhakara et al. |
| 6,143,375 A | 11/2000 | Ross et al. |
| 6,145,849 A | 11/2000 | Bae et al. |

(Continued)

*Primary Examiner* — Holly Rickman
*Assistant Examiner* — Lisa Chau
(74) *Attorney, Agent, or Firm* — Loza & Loza, LLP; Gabriel Fitch

(57) ABSTRACT

HAMR media with a magnetic recording layer having a reduced Curie temperature and methods of fabricating the HAMR media are provided. One such HAMR medium includes a substrate, a heat sink layer on the substrate, an interlayer on the heat sink layer, and a multi-layer magnetic recording layer on the interlayer. In such case, the multi-layer magnetic recording layer includes a first magnetic recording layer including an alloy selected from FePtX and CoPtX, where X is a material selected from the group consisting of Cu, Ni, and combinations thereof, a second magnetic recording layer on the first magnetic recording layer and having at least one material different from the materials of the first magnetic recording layer, and a third magnetic recording layer on the second magnetic recording layer and having at least one material different from the materials of the first magnetic recording layer.

20 Claims, 5 Drawing Sheets

(56) References Cited

U.S. PATENT DOCUMENTS

| | | |
|---|---|---|
| 6,146,737 A | 11/2000 | Malhotra et al. |
| 6,149,696 A | 11/2000 | Jia |
| 6,150,015 A | 11/2000 | Bertero et al. |
| 6,156,404 A | 12/2000 | Ross et al. |
| 6,159,076 A | 12/2000 | Sun et al. |
| 6,164,118 A | 12/2000 | Suzuki et al. |
| 6,200,441 B1 | 3/2001 | Gomicki et al. |
| 6,204,995 B1 | 3/2001 | Hokkyo et al. |
| 6,206,765 B1 | 3/2001 | Sanders et al. |
| 6,210,819 B1 | 4/2001 | Lal et al. |
| 6,216,709 B1 | 4/2001 | Fung et al. |
| 6,221,119 B1 | 4/2001 | Homola |
| 6,248,395 B1 | 6/2001 | Homola et al. |
| 6,261,681 B1 | 7/2001 | Suekane et al. |
| 6,270,885 B1 | 8/2001 | Hokkyo et al. |
| 6,274,063 B1 | 8/2001 | Li et al. |
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,482,330 B1 | 11/2002 | Bajorek |
| 6,482,505 B1 | 11/2002 | Bertero et al. |
| 6,500,567 B1 | 12/2002 | Bertero et al. |
| 6,528,124 B1 | 3/2003 | Nguyen |
| 6,548,821 B1 | 4/2003 | Treves et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,730,420 B1 | 5/2004 | Bertero et al. |
| 6,743,528 B2 | 6/2004 | Suekane et al. |
| 6,759,138 B2 | 7/2004 | Tomiyasu et al. |
| 6,778,353 B1 | 8/2004 | Harper |
| 6,795,274 B1 | 9/2004 | Hsieh et al. |
| 6,855,232 B2 | 2/2005 | Jairson et al. |
| 6,857,937 B2 | 2/2005 | Bajorek |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,964,819 B1 | 11/2005 | Girt et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,045,215 B2 | 5/2006 | Shimokawa |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,239,970 B2 | 7/2007 | Treves et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,282,277 B2 | 10/2007 | Munteanu et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| 7,329,114 B2 | 2/2008 | Harper et al. |
| 7,375,362 B2 | 5/2008 | Treves et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,498,062 B2 | 3/2009 | Calcaterra et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,569,490 B2 | 8/2009 | Staud |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,632,087 B2 | 12/2009 | Homola |
| 7,656,615 B2 | 2/2010 | Wachenschwanz et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,755,861 B1 | 7/2010 | Li et al. |
| 7,758,732 B1 | 7/2010 | Calcaterra et al. |
| 7,833,639 B2 | 11/2010 | Sonobe et al. |
| 7,833,641 B2 | 11/2010 | Tomiyasu et al. |
| 7,862,912 B2 | 1/2011 | Hellwig et al. |
| 7,879,467 B2 | 2/2011 | Chang et al. |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,998,912 B2 | 8/2011 | Chen et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,084,149 B2 | 12/2011 | Soeya |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |

(56) References Cited

U.S. PATENT DOCUMENTS

| | | |
|---|---|---|
| 8,171,949 B1 | 5/2012 | Lund et al. |
| 8,173,282 B1 * | 5/2012 | Sun .................. G11B 5/65 204/192.1 |
| 8,178,480 B2 | 5/2012 | Hamakubo et al. |
| 8,206,789 B2 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,509,039 B1 | 8/2013 | Huang et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,630,060 B2 | 1/2014 | Mosendz et al. |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 8,696,404 B2 | 4/2014 | Sun et al. |
| 8,711,499 B1 | 4/2014 | Desai et al. |
| 8,743,666 B1 | 6/2014 | Bertero et al. |
| 8,758,912 B2 | 6/2014 | Srinivasan et al. |
| 8,787,124 B1 | 7/2014 | Chernyshov et al. |
| 8,787,130 B1 * | 7/2014 | Yuan .................. G11B 5/65 360/135 |
| 8,791,391 B2 | 7/2014 | Bourez |
| 8,795,765 B2 | 8/2014 | Koike et al. |
| 8,795,790 B2 | 8/2014 | Sonobe et al. |
| 8,795,857 B2 | 8/2014 | Ayama et al. |
| 8,800,322 B1 | 8/2014 | Chan et al. |
| 8,811,129 B1 | 8/2014 | Yuan et al. |
| 8,817,410 B1 | 8/2014 | Moser et al. |
| 9,406,329 B1 * | 8/2016 | Ho .................... G11B 5/66 |
| 2002/0060883 A1 | 5/2002 | Suzuki |
| 2003/0022024 A1 | 1/2003 | Wachenschwanz |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek |
| 2004/0209470 A1 | 10/2004 | Bajorek |
| 2005/0036223 A1 | 2/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0202287 A1 * | 9/2005 | Lu .................... G11B 5/65 428/831.2 |
| 2005/0263401 A1 | 12/2005 | Olsen et al. |
| 2006/0147758 A1 | 7/2006 | Jung et al. |
| 2006/0181697 A1 | 8/2006 | Treves et al. |
| 2006/0207890 A1 | 9/2006 | Staud |
| 2007/0070549 A1 | 3/2007 | Suzuki et al. |
| 2007/0245909 A1 | 10/2007 | Homola |
| 2008/0075845 A1 | 3/2008 | Sonobe et al. |
| 2008/0093760 A1 | 4/2008 | Harper et al. |
| 2009/0117408 A1 | 5/2009 | Umezawa et al. |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0311557 A1 | 12/2009 | Onoue et al. |
| 2010/0143752 A1 | 6/2010 | Ishibashi et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |

(56) References Cited

U.S. PATENT DOCUMENTS

| | | |
|---|---|---|
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1* | 10/2012 | Yuan .................... G11B 5/7325 428/800 |
| 2012/0251846 A1 | 10/2012 | Desai et al. |
| 2012/0276417 A1 | 11/2012 | Shimokawa et al. |
| 2012/0307398 A1 | 12/2012 | Kanbe et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0208578 A1* | 8/2013 | Kanbe ....................... G11B 5/66 369/13.24 |
| 2013/0209835 A1* | 8/2013 | Qui ....................... B32B 15/018 428/829 |
| 2013/0216865 A1 | 8/2013 | Yasumori et al. |
| 2013/0230647 A1 | 9/2013 | Onoue et al. |
| 2013/0235491 A1* | 9/2013 | Mosendz ............... B82Y 30/00 360/234.3 |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |
| 2014/0151360 A1 | 6/2014 | Gregory et al. |
| 2014/0234666 A1 | 8/2014 | Knigge et al. |

\* cited by examiner

HEAT ASSISTED MAGNETIC RECORDING (HAMR) MEDIA WITH CURIE TEMPERATURE REDUCTION LAYER

BACKGROUND

Magnetic storage systems, such as a hard disk drive (HDD), are utilized in a wide variety of devices in both stationary and mobile computing environments. Examples of devices that incorporate magnetic storage systems include desktop computers, portable notebook computers, portable hard disk drives, digital versatile disc (DVD) players, high definition television (HDTV) receivers, vehicle control systems, cellular or mobile telephones, television set top boxes, digital cameras, digital video cameras, video game consoles, and portable media players.

A typical disk drive includes magnetic storage media in the form of one or more flat disks. The disks are generally formed of two main substances, namely, a substrate material that gives it structure and rigidity, and a magnetic media coating that holds the magnetic impulses or moments that represent data in a recording layer within the coating. The typical disk drive also includes a read head and a write head, generally in the form of a magnetic transducer which can sense and/or change the magnetic fields stored on the recording layer of the disks.

Energy/Heat Assisted Magnetic Recording (EAMR/HAMR) systems can potentially increase the areal density of information recorded magnetically on various magnetic media. For example, to achieve magnetic information storage levels beyond 1 terabit per square inch, smaller grain size (e.g., less than 6 nm) media may be required. Such designs can demand higher Ku materials for a recording layer to sustain thermal stability, such as L10 ordered FePt alloys. Due to high anisotropy, FePt media is not writable with conventional recording heads. Therefore, either an exchange coupled composite media structure or heat-assisted magnetic recording (HAMR) are generally needed. HAMR media generally includes a magnetic recording layer and a heat sink positioned beneath the magnetic recording layer. To facilitate efficient HAMR, including the use of minimal laser power to achieve heat assisted writing and reading of information on the media, it is often necessary to dissipate heat and/or light energy from the magnetic recording layer. Typically, this is achieved to a certain degree by the heat sink layer. However, the use of minimal and/or reduced laser power may also be helpful.

DETAILED DESCRIPTION

Figure 1:
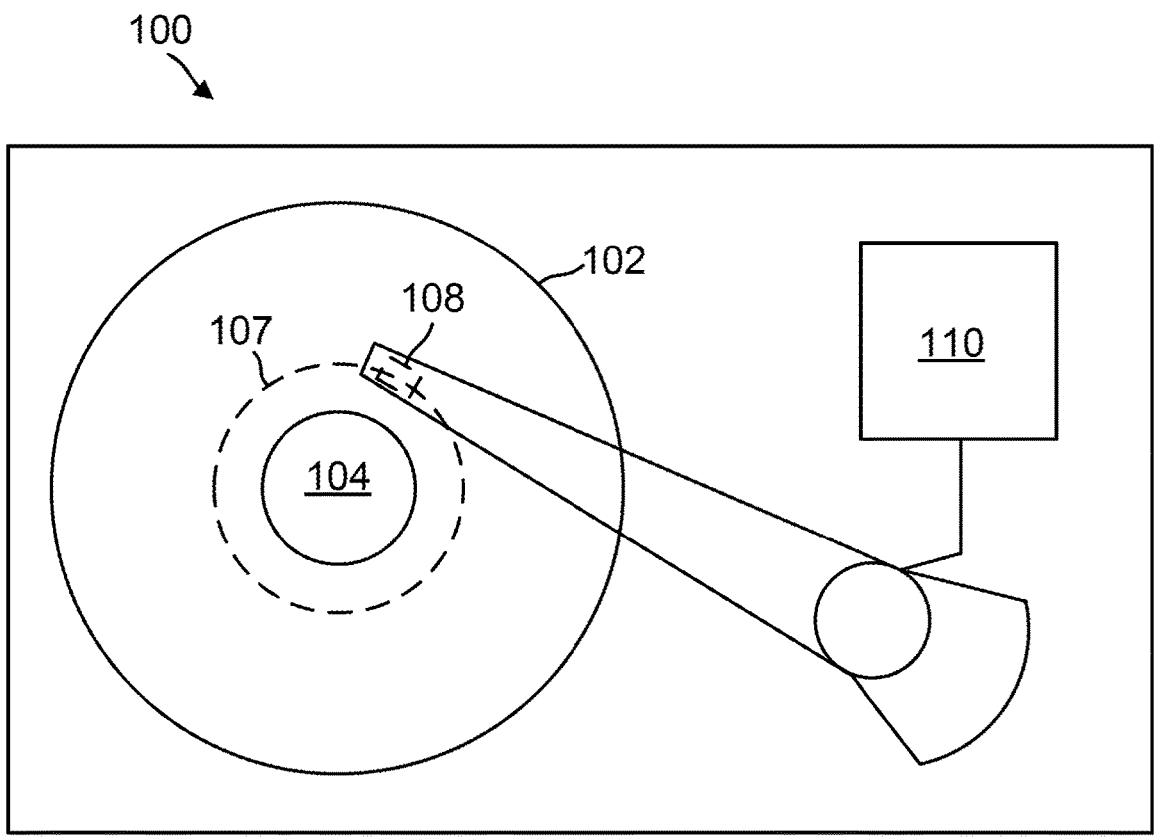
FIG. 1 is a top schematic view of a disk drive configured for heat assisted magnetic recording (HAMR) including a slider and a magnetic medium with a magnetic recording layer having a reduced Curie temperature in accordance with one embodiment of the invention.

It has recently been found that a laser power reduction is beneficial for lifetime improvement in heat assisted magnetic recording (HAMR) applications. More specifically, conventional HAMR systems including HAMR media based on L10 FePt type materials suffer from short lifetimes. Such short lifetimes often result from being unable to decrease laser power (e.g., without signal to noise ratio (SNR) penalties) during HAMR recording. In order to reduce laser power requirements and lower writing temperatures, it is useful to adjust the Curie temperature of the FePt magnetic recording layer. HAMR media with magnetic recording layers having reduced Curie temperatures are described herein and involve a low cost and fabrication friendly approach to control the Curie temperature of the magnetic recording layer for improvement of SNR characteristics and laser power reduction.

Referring now to the drawings, HAMR media with a magnetic recording layer having a reduced Curie temperature and methods of fabricating the HAMR media are illustrated. One such HAMR medium includes a substrate, a heatsink layer on the substrate, an interlayer on the heatsink layer, and a multi-layer magnetic recording layer on the interlayer. In such case, the multi-layer magnetic recording layer includes a first magnetic recording layer including an alloy selected from FePtX and CoPtX, where X is a material selected from Cu, Ni, and combinations thereof, a second magnetic recording layer on the first magnetic recording layer and having at least one material different from the materials of the first magnetic recording layer, and a third magnetic recording layer on the second magnetic recording layer and having at least one material different from the materials of the first magnetic recording layer. In one aspect, a method for fabricating this HAMR medium is described. The HAMR media described herein can provide a reduced Curie temperature as compared to current HAMR media designs, thereby reducing HAMR laser power and extending lifetimes of HAMR components including the media. In addition, the HAMR media described herein can provide a low cost and highly manufacturable approach for improvement of SNR while reducing the HAMR laser power.

FIG. 1 is a top schematic view of a disk drive 100 configured for heat assisted magnetic recording (HAMR) including a slider 108 and a magnetic medium 102 with a magnetic recording layer having a reduced Curie temperature in accordance with one embodiment of the invention. The laser (not visible in FIG. 1 but see 114 in FIG. 2) is positioned with a head/slider 108. Disk drive 100 may include one or more disks/media 102 to store data. Disk/media 102 resides on a spindle assembly 104 that is mounted to drive housing. Data may be stored along tracks in the magnetic recording layer of disk 102. The reading and writing of data is accomplished with the head 108 that may have both read and write elements. The write element is used to alter the properties of the magnetic recording layer of disk 102 and thereby write information thereto. In one embodiment, head 104 may have magneto-resistive (MR), or giant magneto-resistive (GMR) elements. In an alternative embodiment, head 104 may be another type of head, for example, an inductive read/write head or a Hall effect head.

In operation, a spindle motor (not shown) rotates the spindle assembly 104, and thereby rotates disk 102 to position head 108 at a particular location along a desired disk track 107. The position of head 104 relative to disk 102 may be controlled by position control circuitry 110.

Figure 2:
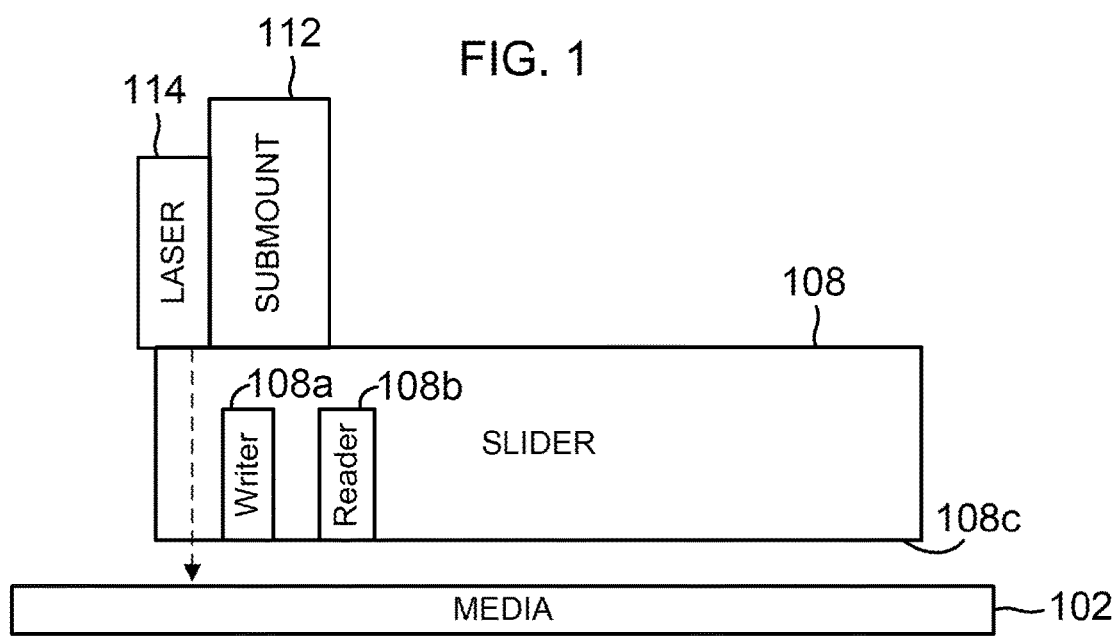
FIG. 2 is a side schematic view of the slider and HAMR magnetic medium of FIG. 1 with the magnetic recording layer having the reduced Curie temperature in accordance with one embodiment of the invention.

FIG. 2 is a side schematic view of the slider 108 and HAMR magnetic medium 102 of FIG. 1 with the magnetic recording layer having the reduced Curie temperature in accordance with one embodiment of the invention. The HAMR system components also include a sub-mount attached 112 to a top surface of the slider 108. The laser 114 is attached to the sub-mount 112, and possibly to the slider 108. The slider 108 includes the write element (e.g., writer) 108a and the read element (e.g., reader) 108b positioned along an air bearing surface (ABS) 108c of the slider for writing information to, and reading information from, respectively, the media 102.

In operation, the laser 114 is configured to generate and direct light energy to a waveguide (possibly along the dashed line) in the slider which directs the light to a near field transducer (NFT) near the air bearing surface (e.g., bottom surface) 108c of the slider 108. Upon receiving the light from the laser 114 via the waveguide, the NFT generates localized heat energy that heats a portion of the media 102 near the write element 108a and the read element 108b. FIGS. 1 and 2 illustrate a specific embodiment of a HAMR system. In other embodiments, the HAMR magnetic medium 102 with the magnetic recording layer having the reduced Curie temperature can be used in other suitable HAMR systems.

Figure 3:
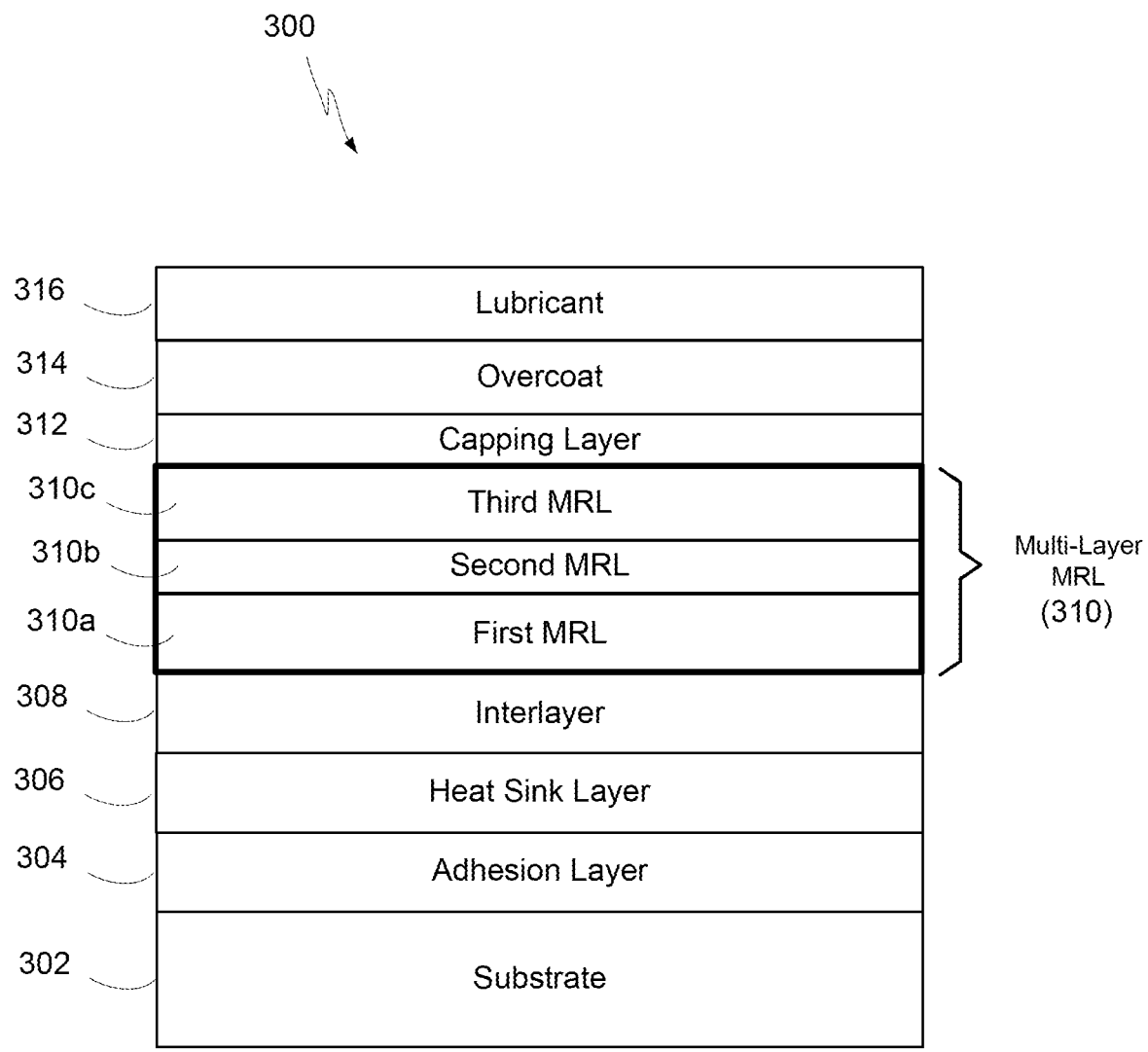
FIG. 3 is a side schematic view of a HAMR magnetic medium with a magnetic recording layer having a reduced Curie temperature in accordance with one embodiment of the invention.

FIG. 3 is a side schematic view of a HAMR magnetic medium 300 with a magnetic recording layer 310 having a reduced Curie temperature in accordance with one embodiment of the invention. The medium 300 has a stacked structure with a glass substrate 302 at a bottom/base layer, an adhesion layer 304 on the glass substrate 302, a heat sink layer (e.g., "heatsink layer") 306 on the adhesion layer 304, an interlayer 308 on the heat sink layer 306, a multi-layer magnetic recording layer (MRL) 310 on the interlayer 308, a capping layer 312 on the multi-layer MRL 310, an overcoat layer 314 on the capping layer 312, and a lubricant layer 316 on the overcoat layer 314. The multi-layer MRL 310 includes a first magnetic recording layer (MRL) 310a on the interlayer 308, a second magnetic recording layer (MRL) 310b on the first MRL 310a, and a third magnetic recording layer (MRL) 310c on the second MRL 310b.

The first MRL 310a may be made of an alloy selected from FePtX and CoPtX, where X is a material selected from Cu, Ni, and combinations thereof. In one embodiment, the first MRL 310a includes a number of magnetic grains segregated by carbon segregants, where the magnetic grains are made of the alloy. In one embodiment, X may be Cu. In one embodiment, X has a atomic percentage of 1 to 30 percent or about 1 to 30 percent. In another embodiment, X has a atomic percentage of 7.5 to 10 percent or about 7.5 to 10 percent. In one embodiment, the first MRL 310a includes, or consists of, L10 FePtCAgX where X is Cu and has an atomic percentage of 1 to 30 percent. In one embodiment, the first MRL 310a is made of an alloy selected from $FePtXX_2$ and $CoPtXX_2$, where $X_2$ is a material selected from the group consisting of Ag, C, BN, and combinations thereof. In several embodiments, the first MRL 310a is magnetic and configured to remain magnetic at temperatures sufficiently high to enable information to be recorded to the multi-layer MRL 310. In several embodiments, the first MRL 310a may include one or more segregant additives such as Cu, Ag, C, Ni, BN.

In several embodiments, the second MRL 310b may have at least one material different from the materials of the first MRL 310a. For example, in one embodiment, the second MRL 310b may be made of an alloy selected from L10 $FePtX_3$ and L10 CoPt $X_3$, where $X_3$ is a material selected from BN, C, and combinations thereof. In such case, the BN, C materials may act as segregant additives. In one embodiment, the second MRL 310b may be made of FePtCBN.

In a number of embodiments, the third MRL 310c may have at least one material different from the materials of the first MRL 310a. For example, in one embodiment, the third MRL 310c may be made of an alloy selected from L10 $FePtX_4$ and L10 $CoPtX_4$, where $X_4$ is a material selected from the group consisting of BN, SiO2, B2O3, ZrO2, and combinations thereof. In such case, the BN, SiO2, B2O3, ZrO2 materials may act as segregant additives. In several embodiments, the third MRL 310c includes at least one material different from the materials of the second MRL 310b. In one embodiment, the third MRL 310c may be made of FetPtBNSiO2.

In several embodiments, the Curie temperature of the first MRL 310a is lower than the Curie temperature of either the second MRL 310b or the third MRL 310c. In such case, the overall Curie temperature of the multi-layer MRL 310 may be reduced as compared to conventional magnetic recording media. In several embodiments, the first MRL 310a, the second MRL 310b, and the third MRL 310c operate collectively (e.g., effectively operate as a single MRL or entity) to enable information to be recorded to the multi-layer magnetic recording layer 310. For example, in one embodiment, one bit of information may collectively be stored within one grain from each MRL, where the grains are positioned at roughly the same horizontal position along the layers and may collectively act like a single vertically oriented grain extending through all three of the layers. This can be the case even if the grains on each MRL are physically distinct based on having different materials. In other embodiments, the one single grain may be replaced by multiple grains on any given layer to store the single bit of information.

In one embodiment, the substrate 302 can be made of one or more materials such as an Al alloy, NiP plated Al, glass, glass ceramic, and/or combinations thereof. In one embodiment, the adhesion layer 304 can include one or more materials such as CrTi, CrTa, NiTa, CoCrTaZr, CoFeZrBCr, CoTaZr, CoFeTaZr, CoCrWTaZr, CoCrMoTaZr, CoZrWMo, combinations thereof, and/or other suitable materials known in the art.

In one embodiment, the heat sink layer 306 can be made of one or more materials such as Ag, Al, Au, Cu, Cr, Mo, Ru, W, CuZr, MoCu, AgPd, CrRu, CrV, CrW, CrMo, CrNd, NiAl, NiTa, combinations thereof, and/or other suitable materials known in the art.

In one embodiment, the interlayer 308 provides a preselected texture for the multi-layer MRL 310. The interlayer 308 can be made of MgO, TiN, TiC, amorphous under layer such as CoCrTaZr, CoWZrMo, body centered cubic (bcc) Cr or Cr alloy, W or W alloy, M or Mo alloy, B2RuAl, NiAl, or other suitable materials. In one embodiment, the interlayer 308 is made of MgO and the amorphous under layer is made of CoWZrMo.

In one embodiment, the capping layer 312 is made of Co, Pt, or Pd. In one embodiment, the capping layer 312 can be a bi-layer structure having a top layer including Co and a bottom layer including Pt or Pd. In addition to the Co/Pt and Co/Pd combinations of top layer and the bottom layer, specific combinations of the top layer materials and the bottom layer materials may include, for example, Co/Au, Co/Ag, Co/Al, Co/Cu, Co/Ir, Co/Mo, Co/Ni, Co/Os, Co/Ru, Co/Ti, Co/V, Fe/Ag, Fe/Au, Fe/Cu, Fe/Mo, Fe/Pd, Ni/Au, Ni/Cu, Ni/Mo, Ni/Pd, Ni/Re, etc. In additional embodiments, top layer materials and bottom layer materials include any combination of Pt and Pd (e.g., alloys), or any of the following elements, alone or in combination: Au, Ag, Al, Cu, Ir, Mo, Ni, Os, Ru, Ti, V, Fe, Re, and the like.

In one embodiment, the overcoat layer 314 is made of carbon. In one embodiment, the lubricant layer 316 is made of a polymer based lubricant. In one embodiment, the HAMR magnetic medium 300 further includes a thermal resistive layer between the heat sink layer 306 and the interlayer 308. The thermal resistive layer can be made of oxides such as ZrO2, SiO2, HfO2, Mg2SiO4, and/or other materials with low thermal conductivity.

The terms "above," "below," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers.

Figure 4:
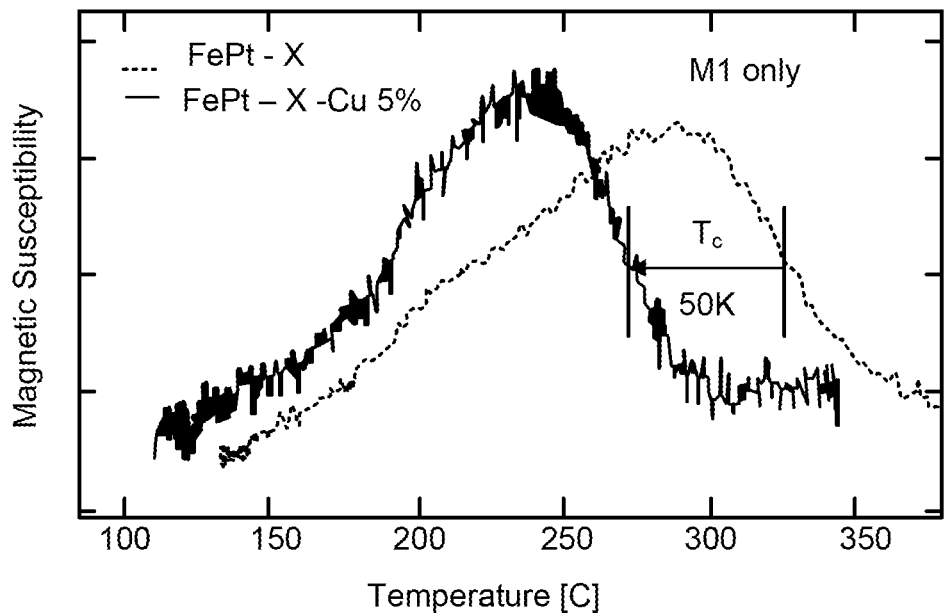
FIG. 4 is a graph of magnetic susceptibility versus temperature for a HAMR magnetic medium with a magnetic recording layer having a reduced Curie temperature in accordance with one embodiment of the invention.

FIG. 4 is a graph of magnetic susceptibility versus temperature (in Celsius or C) for a HAMR magnetic medium with a magnetic recording layer (e.g., FePt-X-Cu 5%) having a reduced Curie temperature in accordance with one embodiment of the invention. The graph also illustrates a conventional HAMR magnetic medium made of FePt-X but without the Cu providing the Curie temperature reduction. As can be seen in the graph the improved HAMR magnetic medium has a Curie temperature that is about 50 degrees C. less than that of the conventional HAMR magnetic medium.

Figure 5A:
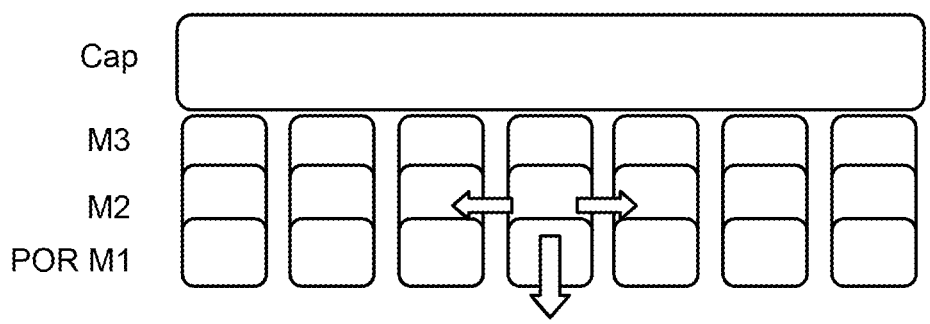
FIG. 5a is a schematic view of a comparative HAMR magnetic medium without a magnetic recording layer having a reduced Curie temperature and associated heat spreading among grains of the magnetic recording layer.

FIG. 5a is a schematic view of a comparative HAMR magnetic medium without a magnetic recording layer having a reduced Curie temperature and associated heat spreading among grains of the magnetic recording layer. The arrows depict the direction (e.g., arrow direction) and magnitude (e.g., arrow size) of heat spreading among grains of the magnetic recording layer. As can be seen in FIG. 5a, the comparative HAMR magnetic medium has a certain amount of lateral heat spreading (e.g., in a direction along the top surface of the cap layer) and a certain amount of heat spreading in a downward direction toward a heat sink layer (not shown). In one aspect, the reference labels "M1", "M2", and "M3" for the layers can correspond to a first MRL (e.g., such as 310a in FIG. 3), a second MRL (e.g., such as 310b in FIG. 3), and a third MRL (e.g., such as 310c in FIG. 3). In one aspect, the reference label "Cap" can correspond to the capping layer 312 in FIG. 3.

Figure 5B:
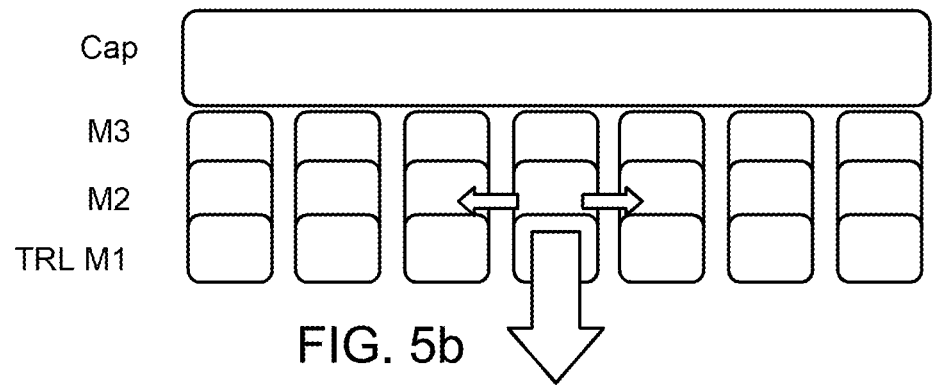
FIG. 5b is a schematic view of a HAMR magnetic medium with a magnetic recording layer having a reduced Curie temperature and associated heat spreading among grains of the magnetic recording layer in accordance with one embodiment of the invention.

FIG. 5b is a schematic view of a HAMR magnetic medium with a magnetic recording layer having a reduced Curie temperature and associated heat spreading among grains of the magnetic recording layer in accordance with one embodiment of the invention. The heat spreading of FIG. 5b can be compared to the heat spreading of the comparative HAMR magnetic medium of FIG. 5a. In particular, the downward heat spreading of the magnetic recording layer, and M1 (e.g., the first MRL 310a of FIG. 3) in particular, is substantially greater than the corresponding heat spreading of the comparative HAMR magnetic medium of FIG. 5a. In addition, while the downward heat spreading is substantially greater in FIG. 5b, the lateral heat spreading is substantially the same. This desirable result is somewhat unexpected since one might expect the heat spreading to increase in all directions. While not bound by any particular theory, it may be that the segregants disposed between the magnetic grains in M1 limit the lateral heat spreading even when M1 has been configured to increase heat spreading by adding the appropriate materials (e.g., Cu, Ni, etc.).

In one embodiment, the first magnetic recording layer (e.g., M1 or first MRL 310a of FIG. 3) is configured to facilitate a heat transfer from the second magnetic recording layer (e.g., M2 or second MRL 310b of FIG. 3) to the heat sink layer that is greater than a lateral heat transfer within the first magnetic recording layer. This can be observed in FIG. 5b based on the relative sizes of the arrows depicted heat spreading.

Figure 6:
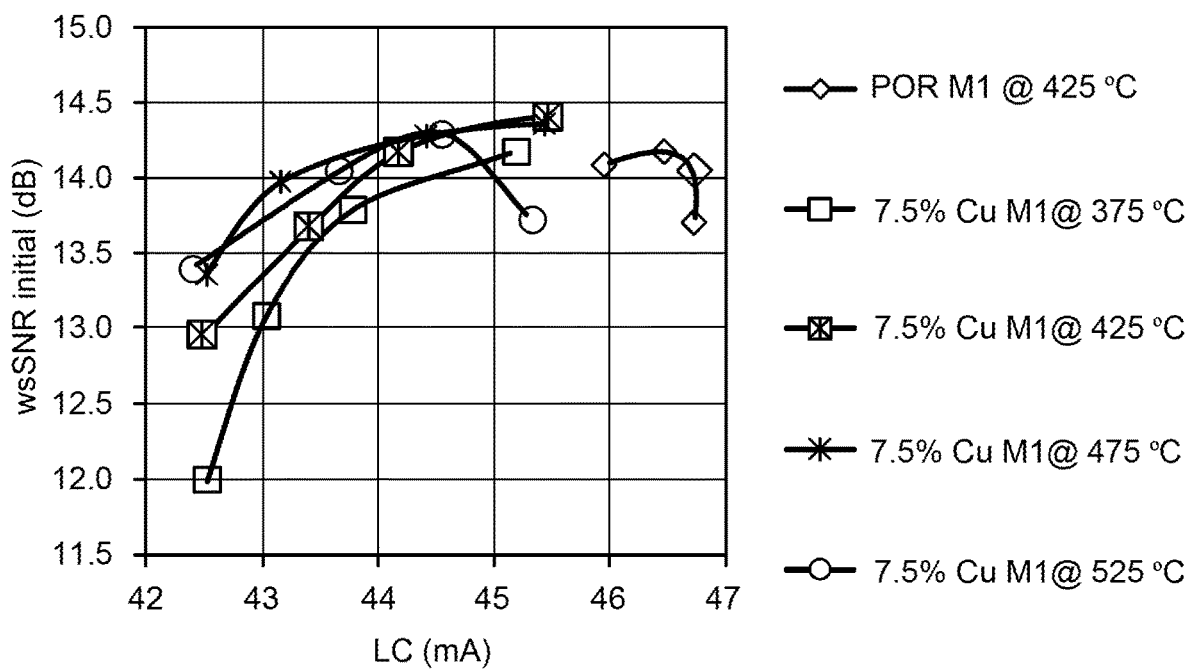
FIG. 6 is a graph of initial weighted signal to noise ratio (SNR) versus laser current for a HAMR system including a magnetic medium with a magnetic recording layer having a reduced Curie temperature in accordance with one embodiment of the invention.

FIG. 6 is a graph of initial weighted signal to noise ratio (SNR in decibels or dB) versus laser current (in milliamps or mA) for a HAMR system including a magnetic medium with a magnetic recording layer having a reduced Curie temperature in accordance with one embodiment of the invention. In the graph, data from a comparative magnetic medium "POR M1 @ 425" is shown along with data for four HAMR magnetic mediums ("7.5% Cu M1@ 375", "7.5% Cu M1@ 425", "7.5% Cu M1@ 475", and "7.5% Cu M1@ 525"), each with a magnetic recording layer having a reduced Curie temperature at various writing temperatures. As can be seen in the graph, the comparative magnetic medium "POR M1 @ 425" needs a maximum laser current or LC of about 46.75 mA at about 13.75 dB, while the corresponding minimum LC of the HAMR magnetic medium with the magnetic recording layer having the reduced Curie temperature (e.g., SNR curves for "7.5% Cu M1@ 475" or "7.5% Cu M1@ 525") is about 42.75 mA also at about 13.75 dB, thereby illustrating a reduction of the required laser current by about 4 mA. In addition, the highest SNR for the HAMR magnetic medium with the magnetic recording layer having the reduced Curie temperature is about 14.4 dB while the average SNR for the comparative magnetic medium is about 14.1 dB, thereby illustrating an increase in SNR of about 0.3 dB. Thus, for a given laser power of say 44 mA, the SNR might be slightly improved, while a more notable improvement might relate to the reduction in laser power/current.

Figure 7:
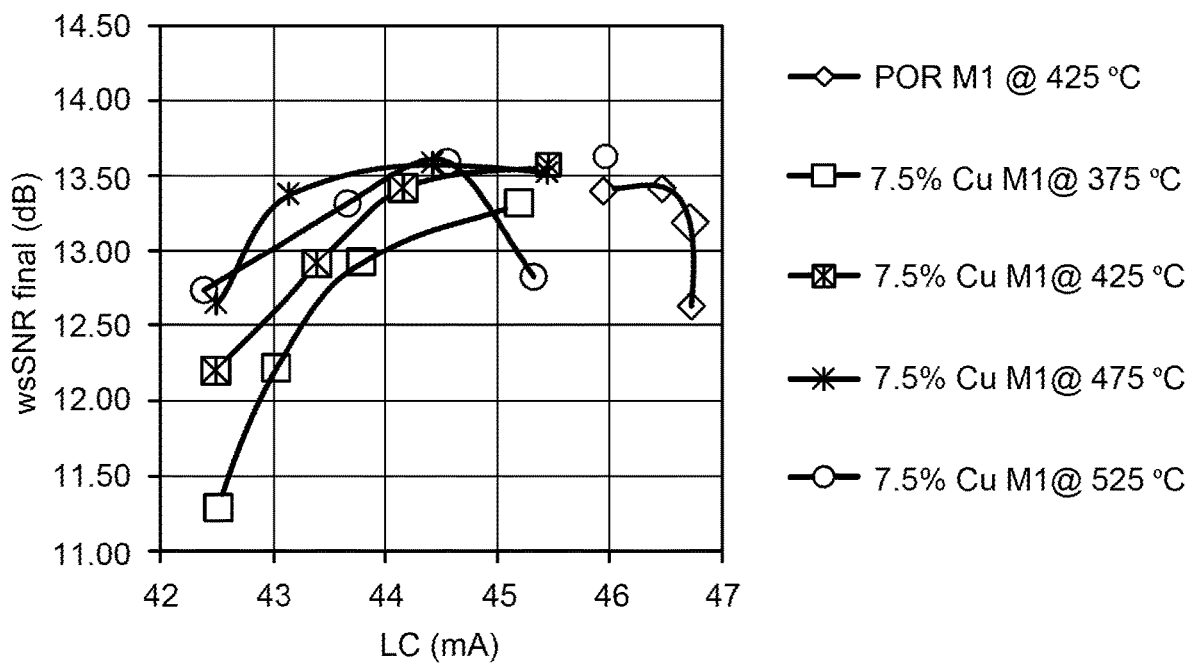
FIG. 7 is a graph of final weighted signal to noise ratio (SNR) versus laser current for a HAMR system including a magnetic medium with a magnetic recording layer having a reduced Curie temperature in accordance with one embodiment of the invention.

FIG. 7 is a graph of final weighted signal to noise ratio (SNR) versus laser current for a HAMR system including a magnetic medium with a magnetic recording layer having a reduced Curie temperature in accordance with one embodiment of the invention. While FIG. 6 depicts the results of the SNR tests at initial writing conditions, FIG. 7 depicts the results of the SNR tests at final writing conditions where one or more adjacent track writes have been performed to test lateral heat spreading. As can be seen in FIG. 7, the overall SNR and SNR improvement (e.g., delta of POR compared with improved HAMR media) decreases somewhat because of the adjacent track writing. However, the laser current reduction of about 4 mA appears to remain.

Figure 8:
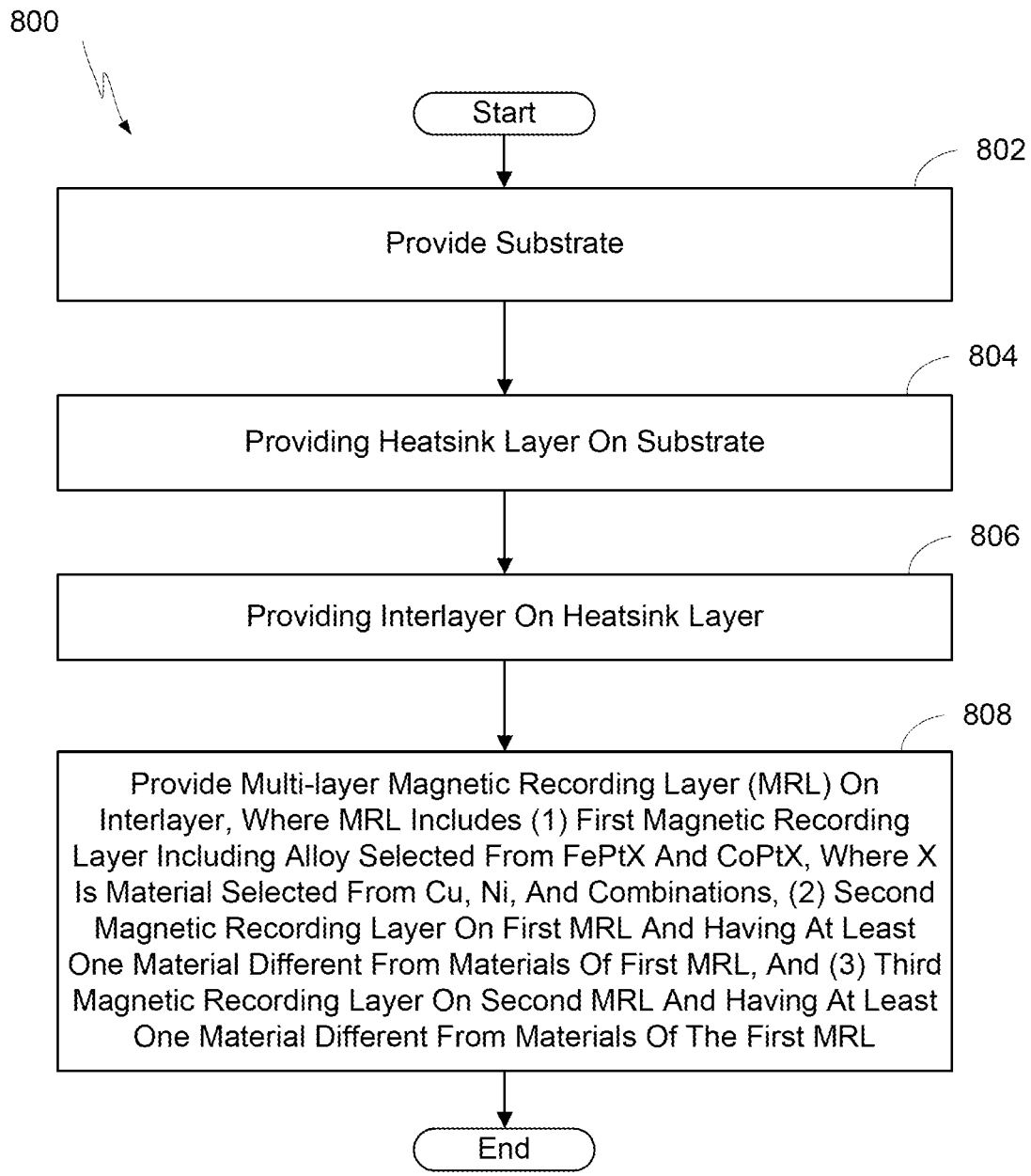
FIG. 8 is a flowchart of a process for fabricating a HAMR magnetic medium with a magnetic recording layer having a reduced Curie temperature in accordance with one embodiment of the invention.

FIG. 8 is a flowchart of a process 800 for fabricating a HAMR magnetic medium with a magnetic recording layer having a reduced Curie temperature in accordance with one embodiment of the invention. In one embodiment, the process 800 can be used to fabricate the HAMR magnetic medium of FIG. 3. In block 802, the process provides a substrate. In block 804, the process provides a heat sink layer on the substrate. In block 806, the process provides an interlayer on the heat sink layer. In block 808, the process provides a multi-layer magnetic recording layer on the interlayer, where the multi-layer magnetic recording layer includes a first magnetic recording layer comprising an alloy selected from FePtX and CoPtX, where X is a material selected from the group consisting of Cu, Ni, and combinations thereof, a second magnetic recording layer on the first magnetic recording layer and having at least one material different from the materials of the first magnetic recording layer, and a third magnetic recording layer on the second magnetic recording layer and having at least one material different from the materials of the first magnetic recording layer.

In one embodiment, the process can perform the sequence of actions in a different order. In another embodiment, the process can skip one or more of the actions. In other embodiments, one or more of the actions are performed simultaneously. In some embodiments, additional actions can be performed.

In several embodiments, the deposition of such layers can be performed using a variety of deposition sub-processes, including, but not limited to physical vapor deposition (PVD), sputter deposition and ion beam deposition, and chemical vapor deposition (CVD) including plasma enhanced chemical vapor deposition (PECVD), low pressure chemical vapor deposition (LPCVD) and atomic layer chemical vapor deposition (ALCVD). In other embodiments, other suitable deposition techniques known in the art may also be used.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A magnetic recording medium for heat assisted magnetic recording, the medium comprising:
a substrate;
a heatsink layer on the substrate;
an interlayer on the heatsink layer; and
a multi-layer magnetic recording layer on the interlayer and comprising:
a first magnetic recording layer comprising an alloy selected from the group consisting of FePtX and CoPtX, where X is a material selected from the group consisting of Cu, Ni, and combinations thereof;
a second magnetic recording layer on the first magnetic recording layer and having at least one element different from materials of the first magnetic recording layer; and
a third magnetic recording layer on the second magnetic recording layer and having at least one element different from the materials of the first magnetic recording layer, and at least one element different from materials of the second magnetic recording layer,
wherein the first magnetic recording layer further comprises a plurality of magnetic grains segregated by carbon segregants, wherein the plurality of magnetic grains comprise the alloy such that a heat transfer from the second magnetic recording layer to the heatsink layer is greater than a lateral heat transfer within the first magnetic recording layer.

2. The medium of claim 1:
wherein the first magnetic recording layer is magnetic and configured to remain magnetic at temperatures sufficiently high to enable information to be recorded to the multi-layer magnetic recording layer.

3. The medium of claim 1, wherein the first magnetic recording layer, the second magnetic recording layer, and the third magnetic recording layer operate collectively to enable information to be recorded to the multi-layer magnetic recording layer.

4. The medium of claim 1:
wherein the first magnetic recording layer comprises an alloy selected from the group consisting of $FePtXX_2$ and $CoPtXX_2$, where $X_2$ is a material selected from the group consisting of Ag, C, BN, and combinations thereof;
wherein the second magnetic recording layer comprises an alloy selected from the group consisting of L10 $FePtX_3$ and L10 CoPt $X_3$, where $X_3$ is a material selected from the group consisting of BN, C, and combinations thereof; and
wherein the third magnetic recording layer comprises an alloy selected from the group consisting of L10 $FePtX_4$ and L10 CoPt $X_4$, where $X_4$ is a material selected from the group consisting of BN, $SiO_2$, $B_2O_3$, $ZrO_2$, and combinations thereof.

5. The medium of claim 1, wherein X has a atomic percentage of 1 to 30 percent.

6. The medium of claim 1, wherein X is Cu.

7. The medium of claim 1, wherein the first magnetic recording layer comprises L10 FePtCAgX where X is Cu and has a atomic percentage of 1 to 30 percent.

8. The medium of claim 1, further comprising:
an adhesion layer on the substrate, wherein the heatsink layer is on the adhesion layer;
a thermal resistive layer on the heatsink layer, wherein the interlayer is on the thermal resistive layer;
a cap layer on the multi-layer magnetic recording layer; and
an overcoat layer on the cap layer.

9. The medium of claim 1, wherein a curie temperature of the first magnetic recording layer is less than a curie temperature of either the second magnetic recording layer or the third magnetic recording layer.

10. The apparatus of claim 1, wherein the first magnetic recording layer comprising an alloy selected from the group consisting of FePtCuAg and CoPtCuAg.

11. A method for manufacturing a magnetic recording medium for heat assisted magnetic recording, the method comprising:
providing a substrate;
providing a heatsink layer on the substrate;
providing an interlayer on the heatsink layer; and
providing a multi-layer magnetic recording layer on the interlayer and comprising:
a first magnetic recording layer comprising an alloy selected from the group consisting of FePtX and CoPtX, where X is a material selected from the group consisting of Cu, Ni, and combinations thereof;
a second magnetic recording layer on the first magnetic recording layer and having at least one element different from materials of the first magnetic recording layer; and
a third magnetic recording layer on the second magnetic recording layer and having at least one element different from the materials of the first magnetic recording layer, and at least one element different from materials of the second magnetic recording layer,
wherein the first magnetic recording layer further comprises a plurality of magnetic grains segregated by carbon segregants, wherein the plurality of magnetic grains comprise the alloy such that a heat transfer from the second magnetic recording layer to the heatsink layer is greater than a lateral heat transfer within the first magnetic recording layer.

12. The method of claim 11:
wherein the first magnetic recording layer is magnetic and configured to remain magnetic at temperatures sufficiently high to enable information to be recorded to the multi-layer magnetic recording layer.

13. The method of claim 11, wherein the first magnetic recording layer, the second magnetic recording layer, and the third magnetic recording layer operate collectively to enable information to be recorded to the multi-layer magnetic recording layer.

14. The method of claim 11:
wherein the first magnetic recording layer comprises an alloy selected from the group consisting of $FePtXX_2$ and $CoPtXX_2$, where $X_2$ is a material selected from the group consisting of Ag, C, BN, and combinations thereof;
wherein the second magnetic recording layer comprises an alloy selected from the group consisting of L10 $FePtX_3$ and L10 CoPt $X_3$, where $X_3$ is a material selected from the group consisting of BN, C, and combinations thereof; and
wherein the third magnetic recording layer comprises alloy selected from the group consisting of L10 $FePtX_4$ and L10 CoPt $X_4$, where $X_4$ is a material selected from the group consisting of BN, $SiO_2$, $B_2O_3$, $ZrO_2$, and combinations thereof.

15. The method of claim 11, wherein X has a atomic percentage of 1 to 30 percent.

16. The method of claim 11, wherein X is Cu.

17. The method of claim 11, wherein the first magnetic recording layer comprises L10 FePtCAgX where X is Cu and has a atomic percentage of 1 to 30 percent.

18. The method of claim 11, further comprising:
providing an adhesion layer on the substrate, wherein the heatsink layer is on the adhesion layer;
providing a thermal resistive layer on the heatsink layer, wherein the interlayer is on the thermal resistive layer;
providing a cap layer on the multi-layer magnetic recording layer; and
providing an overcoat layer on the cap layer.

19. The method of claim 11, wherein a curie temperature of the first magnetic recording layer is less than a curie temperature of either the second magnetic recording layer or the third magnetic recording layer.

20. The method of claim 11, wherein the first magnetic recording layer comprising an alloy selected from the group consisting of FePtCuAg and CoPtCuAg.

* * * * *